INVENTOR.
ROBERT A. HORTON

United States Patent Office 3,636,190
Patented Jan. 18, 1972

3,636,190
METHODS OF REMOVING PATTERNS FROM INVESTMENT MOLDS
Robert A. Horton, Chesterland, Ohio, assignor to Precision Metalsmiths, Inc.
Filed Sept. 25, 1967, Ser. No. 670,050
Int. Cl. B22c 9/04; B29c 1/02
U.S. Cl. 264—221      12 Claims

ABSTRACT OF THE DISCLOSURE

A method of removing patterns from an investment mold including the steps of subjecting the mold to a heated medium at a temperature sufficient to melt or soften the pattern material and to an external pressure sufficient to resist the cracking forces produced by the pattern material as it is heated.

BACKGROUND OF THE INVENTION

This invention relates generally to the art of investment casting, and more specifically to methods of removing patterns from investment molds.

In the lost pattern process of investment casting, a pattern assembly, commonly referred to as a "set-up" or "tree," is prepared by attaching a plurality of patterns to a suitable sprue member. The patterns, which are replicas of the parts to be cast and which include the necessary gates and risers, are made of a disposable material, such as wax, a synthetic resin or a combination of wax and synthetic resin. The set-up or tree is coated or invested with a refractory material in order to form a mold, and thereafter the patterns are destroyed in a pattern removal operation to form the mold cavities.

The refractory molds usually are either solid bulk molds or ceramic shell molds. Solid bulk molds may be made by dipping the set-up or tree into a refractory slurry which hardens to form a smooth coating that serves as the mold face. This initial coating is usually sanded or stuccoed while wet with coarse refractory materials. After the precoat or dip coat has dried, the coated set-up is placed in a heat-resistant flask and the flask is filled with a cementitious refractory material, known as the investment, which hardens at room temperature to form the bulk of the mold. Ceramic shell molds are usually prepared by repeating the dipping and stuccoing operations until a refractory shell having a sufficient thickness to resist the stresses occurring in subsequent operations has been built up around the set-up. The usual thickness range is from ⅛ of an inch to ½ of an inch, although thinner or heavier shells may be formed for special situations.

A problem which has been encountered in the processing of both solid bulk molds and ceramic shell molds is that of removing the pattern material without cracking the mold walls. This problem of removing disposable patterns from investment molds is well known and arises from the fact that the thermal expansion coefficients of the usual pattern materials are much higher than those of the refractory materials that form the mold. Thus, when the refractory mold is heated to melt the patterns, the internal expansion forces created by the heated pattern material are capable of cracking the surrounding walls of the mold. In addition to the difference in thermal expansion coefficients, the conventionally used pattern waxes generally exhibit a large volume change in passing from the solid to the liquid state and this volume change may cause further cracking if the wax is melted faster in any area than it can either flow out of the mold opening or soak through the mold wall. The problem of cracking is more severe in the case of thin-walled ceramic shell molds than it is in the case of the solid bulk molds which may be strong enough to withstand the pressures created by the heated pattern materials. Nevertheless, some cracking of solid bulk molds frequently does occur, this being particularly true when patterns formed of synthetic resin are used.

A commonly practiced technique used in the past for eliminating patterns formed of wax and wax blends from shell molds is a procedure known as "flash dewaxing." According to this procedure, the shell molds are placed directly into a furnace operating at an elevated temperature, for example, at a temperature in the range of from about 1600° F. to about 1800° F. Due to the condition of the intense heat and the low thermal diffusivity of the wax, the heat transfer through the shell may be rapid enough to melt a surface skin of the patterns before the bulk of the wax can heat up enough to expand and crack the shell. The molten surface material either flows out of the mold opening or soaks through the shell and the space provided in each mold cavity by the melting of the material may be sufficient to accommodate the expansion of the bulk of the material so that it will not expand and crack the shell upon further heating.

While the flash dewaxing technique has been widely used, it possesses certain disadvantages and does not completely eliminate the occurrence of cracking. For example, even the small thickness of wax initially melten on the surfaces of the patterns is capable of producing some pressure and this pressure has produced occasional cracking, especially in thin or weak shells. A more serious source of cracking encountered with flash dewaxing procedures results from the fluid pressure which sometimes occurs when the extremities of the pattern melt very rapidly so that the molten wax cannot flow out of the mold or soak through the shell fast enough to relieve the pressure build-up. In such instances, the shell around an entire face of the pattern has been blown off by the pressure. In order to avoid such occurrences, shell molds are frequently formed with wax relief holes which must be patched prior to casting.

Ceramic shell molds dewaxed by the procedure described above are also subject to cracking due to the thermal shock resulting from the high temperatures involved and the fact that the shell must be plunged directly into the furnace. Additional cracking may occur during cooling of the mold. This problem is particularly serious when the shells have relatively large unbroken surfaces. In attempts to avoid cracking due to thermal shocks, it has been proposed to form relatively expensive molds containing 97% or more fused silica as the refractory material in order to take advantage of its low coefficient of thermal expansion and resulting resistance to thermal shock.

Still another disadvantage of the flash dewaxing procedure is that the shells must be carefully dried in order to be dewaxed successfully by this technique. Otherwise, the evolution of steam or other volatile material from the binder solution used to form the mold slurry will be so rapid that cracking will result. The evolution of steam or other volatile material also may cause bulging of the mold faces and disintegration of internal portions, such as cores.

Another procedure which has been used in the past to remove pattern materials from refractory molds involves exposing the molds to an atmosphere of saturated steam under pressure in an autoclave. The use of an autoclave also has certain attendant disadvantages. Among these disadvantages is the fact that the saturated steam used to melt the patterns may soften the mold in the process. Consequently, it is necessary carefully to dry the molds following the pattern removal operation in order to restore their refractory characteristics and make them suitable for casting. Since the molds are subjected to saturated steam, the process also limits the binders which can be used in the refractory slurry to water insoluble binders.

When using an autoclave to remove the patterns from a mold, the temperature and pressure in the autoclave cannot be adjusted independently of each other. The setting of the pressure fixes the temperature and temperatures high enough to melt high melting point pattern materials may require uneconomically high pressures. Another disadvantage is that the molds can be damaged if the pressure in the autoclave is released too suddenly. The condensed water in the pores of the mold is above its normal boiling point and will boil rapidly when the pressure is released. This can cause cracking of the mold, flaking of the inner mold layers, and rough surfaces. Further, the boiling of the wax and water mixture in the bottom of the autoclave when the pressure is released can cause dirt and/or refractory particles to splash into the mold.

A further disadvantage of both the flash dewaxing technique and the pattern removal procedure utilizing an autoclave is that such procedures are not applicable for all types of patterns materials. More specifically, attempts to remove patterns formed of synthetic resins such as polystyrene in an autoclave and in a furnace at elevated temperatures have not been successful due to the mold cracking. This is because the synthetic resins soften very gradually without significant melting at the mold interface. As a result, plastic patterns will expand and crack shell molds before becoming fluid enough either to be absorbed into the mold or squeeze out of the mold opening. Furthermore, the conventionally used plastics, especially polystyrene, tend to decompose rapidly under intense heat, and it is believed that the vapors which are evolved become trapped in the remaining viscous plastic to produce a foaming mass which further increases the cracking pressures within the mold.

As will be apparent from the foregoing discussion, the characteristics of refractory investment molds, particularly the ceramic shell molds, the different types of pattern materials now in use, and the wide range of sizes and shapes of parts made by investment molding processes complicate the pattern removal operations and impose diverse requirements which must be satisfied in order to destroy the pattern successfully without damaging the molds. While the above-discussed prior pattern removal methods have been practiced with some success in the particular situations for which they are best suited, the inherent disadvantages of the conventional procedures limit a wide range of application to all pattern and mold materials, as well as to all sizes and shapes of the molds and patterns.

SUMMARY OF THE INVENTION

The present invention provides new, versatile pattern removal techniques which overcome the disadvantages of the prior methods and can be used successfully in conjunction with the known type of pattern materials, including waxes, synthetic resins and wax and synthetic resin blends, and mold materials. Although the advantages of the invention are particularly significant when processing ceramic shell molds, the new techniques are also suitable for solid bulk molds and thereby make it possible to remove patterns from both types of molds by the same procedure. Further, the techniques can be employed with all sizes and shapes of molds and are compatible with the different types of refractory materials and binders, including both water soluble and water insoluble binders, now in use.

In accordance with the general practice of the invention, the refractory mold is subjected to a hot, pressurized medium in order to melt and remove the patterns from the mold. The heating of the molds under pressure counteracts the internal expansion forces created by the heated patterns and thereby reduces the pressure differential across the mold wall. An important advantage of the new technique is that the pressure and temperature of the medium to which the mold is subjected can be controlled independently of each other in accordance with the thermal expansion coefficient and the melting point of the particular pattern material. It is also possible to fully or partially pressurize the outside mold before any heating of the patterns occurs. By selectively applying and adjusting the pressure in accordance with the thermal expansion coefficient of the particular pattern material, the strength required in the mold can be reduced and patterns can be successfully removed from thinner and weaker molds than could be processed in the past.

As distinguished from the prior art practice of subjecting molds to an atmosphere of saturated steam under pressure, the new process of this invention preferably employs a heating and pressure transferring medium which is inert to the mold materials. More particularly, the heating the pressure transmitting medium is selected so that it will not soften the mold or otherwise react with the mold materials to reduce their refractory properties or adversely affect the mold dimensions which are critical to a successful precision casting process.

Among other advantages, the method of this invention reduces the occurrence of mold cracking due to the evolution of steam and volatile matter from the binder solution used to form the mold slurry. It also provides for increased versatility in the selection of the mold material, including the use of binders which may be water soluble and the use of refractory materials which are less expensive than those necessitated by many of the prior art pattern removal techniques.

According to one preferred embodiment of the invention, a hot, pressurized liquid is employed as the heating and pressure transmitting medium. The mold may be placed in an enclosed chamber and the chamber filled with the hot liquid at a temperature sufficient to melt the patterns and under a pressure sufficient to resist mold cracking. The use of a hot liquid, which may be pressurized by air, is convenient, economical and relatively simple. This technique eliminates the need for expensive equipment and special facilities, such as provision for high pressure steam which are not normally available in foundries.

According to another preferred embodiment of the invention, the molds are heated in a pressurized atmosphere having less than 100% relative humidity. In carrying out this embodiment of the invention, the molds can be pressurized in a closed chamber and heated by a stream of hot gas, such as air. If desired, the molds may be subjected to pressure prior to the application of heat. By this two stage process, the problem of mold distortion and/or cracking due to thermal shock, such as occurred when the molds were plunged directly into a furnace at an elevated temperature, has been overcome. This invention also contemplates the use of alternate heating means, such as radiant burners which may be placed in the pressure chamber.

An object of the invention is to provide new methods for removing patterns from investment molds which can be employed successfully in conjunction with all of the commonly used types of pattern and mold materials.

Another object of the invention is to provide new methods of pattern removal which overcome the disadvantages attendant to the use of autoclaves, flash dewaxing procedures and other conventional practices.

Still another object of the invention is to provide new methods of pattern removal which are economical and do not require the use of expensive equipment and other special facilities.

Other objects and advantages and a fuller understanding of the invention will be had by reference to the following detailed description and the accompanying drawing.

DESCRIPTION OF THE PREFERRED EMBODIMENTS

Figure 1:
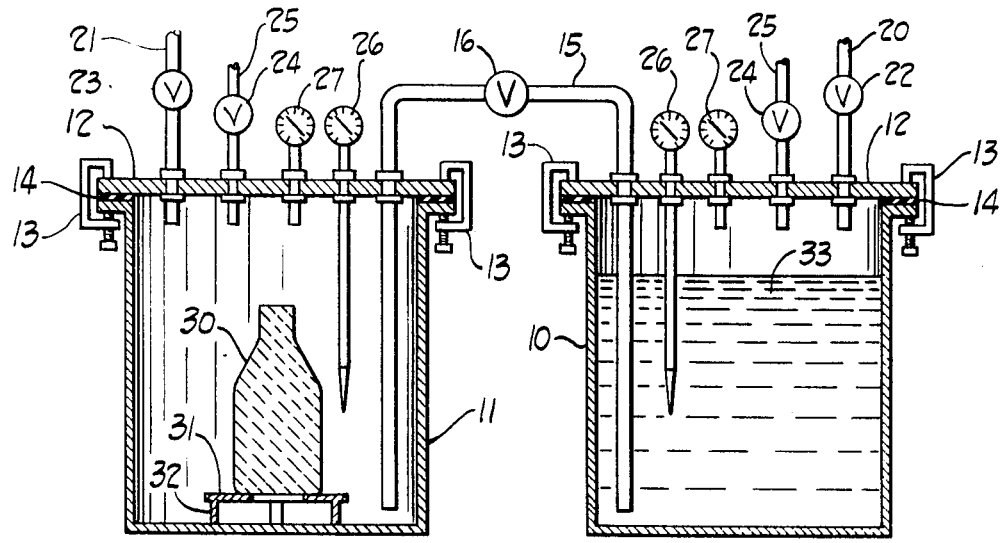
FIG. 1 is an elevational view, partially in cross-section, diagrammatically illustrating an apparatus useful in carrying out a preferred embodiment of the process of the present invention.

Referring to the drawing, and to FIG. 1 in particular, there is shown an apparatus suitable for carrying out one preferred embodiment of the invention wherein a hot, pressurized liquid is used as the heating and pressure-transmitting medium for the pattern removal operation. The illustrated apparatus comprises two tanks 10 and 11. Each tank is provided with a removable top 12 which can be suitably secured to the tank, as by clamps 13, in order to form a closed pressure chamber. A gasket 14 may be provided between each top 12 and an upper flanged portion of the respective tank 10 or 11.

The tank 10 communicates with the tank 11 through a conduit 15 and a control valve 16. The connecting conduit 15 projects downwardly through the tops 12 of the tanks to near their bottom walls and is preferably provided with a coupling (not shown) so that the conduit can be disconnected in order to remove either of the tops 12. A source of gas under pressure, such as a compressed air supply normally available in industrial plants and laboratories, is connected to the top of the tank 10 by a conduit 20 and to the top of the tank 11 by a conduit 21. The supply of gas under pressure to the tanks 10 and 11 is adapted to be controlled by valves 22 and 23 in the conduits 20 and 21, respectively. Preferably, each tank 10 and 11 is provided with a relief valve 24 which permits the pressure in the tanks to be selectively released. The relief valves 24 are connected to the interiors of the tanks 10 and 11 by pipes 25 which extend through the tops 12. As shown, the top 12 for each of the tanks 10 and 11 also is provided with a thermometer 26 and a pressure gauge 27.

In carrying out the process, a refractory mold 30 containing the patterns to be removed is placed in one of the tanks, for example, the tank 11, so that the mouth or opening of the mold is uppermost. The mold 30 may be supported on a ring 31 which is spaced above the bottom of the tank 11 by legs 32 in order to afford circulation of a liquid around the bottom of the mold.

A liquid 33, which is heated to a temperature sufficient to melt or soften the particular pattern material to be removed, is placed in the other tank 10. The depth of the liquid 33 in the tank is preferably sufficient to submerge the mold 30 when the liquid is subsequently transferred into the tank 11. With the valves 16, 23 and 24 closed, the valve 22 connecting the interior of the tank 10 to the source of compressed air or other gas under pressure is opened in order to pressurize the tank 10 above the liquid 33. When a predetermined pressure has been obtained in the tank 10, the valve 16 in the connecting pipe 15 between the tanks 10 and 11 is opened and the liquid 33 is permitted to flow into the tank 11 under pressure. The mold 30 is allowed to remain in the hot liquid 33 under pressure for the length of time necessary to melt or soften the patterns. Thereupon the valve 22 is closed and the relief valve 24 for the tank 10 is opened in order to vent it to the atmosphere. Opening of the valve 23 admits gas under pressure to the tank 11 to force the hot liquid 33 to the tank 10.

When using the apparatus shown in FIG. 1, it is possible to carry out the pattern removal operation alternately in one tank and then the other. For example, when the patterns have been removed from the mold 30 in the tank 11, another mold can be placed into the tank 10 and the hot liquid in the tank 11 forced into the tank 10 under pressure in order to melt or soften the patterns in the other mold. When operated in a continuous manner by processing the molds first in one tank and then the other, suitable provisions may be made for heating the liquid in order to maintain it at the desired temperature. For example, the tank 10 and/or the tank 11 can be provided with heating coils or the like. It is also possible to connect to the tanks 10 and 11 a third tank in which an extra supply of the liquid 33 could be heated and/or in which melted pattern material could be separated from the liquid.

The particular liquid which is selected for use as the heating and pressure-transmitting medium depends primarily upon the characteristics of the pattern material and the material used to make the refractory molds. The liquid must be capable of being heated to the desired temperature necessary to melt the pattern material and should not attack the refractory molds in a harmful manner, for example, by dissolving the refractory binder and softening the refractory material. It is also desirable, although not necessary, to select a liquid which has a higher density than the pattern material and in which the pattern material is insoluble. Because of the insolubility of the pattern material and the higher density of the liquid, the melted pattern material will float away from the mold during the pattern removal operation to form a layer on the top of the liquid and this layer of melted material can be periodically removed and reused. If the liquid is a solvent for the pattern material, it should not be so fast acting that it will penetrate through the porous walls of the mold and cause the patterns to swell and crack the mold walls during the time interval required for the melting operation.

There are many liquids suitable for use as the heating and pressure transmitting medium in order to provide the functions and properties necessary in carrying out the above-described process. Glycerin, for example, has been found to be a good heating medium. Most of the conventionally used pattern materials are insoluble in glycerine and have a lower density so that the melted pattern material can be easily separated and recovered. Glycerine also will not adversely affect the molds as by softening the refractory or dissolving the commonly used binders, including sodium silicate which is one of the least expensive binders available. Since sodium silicate is water soluble, shell molds formed with this binder usually cannot be processed successfully in an autoclave to remove the patterns. Other liquids that are useful, especially where high operating temperatures are desired, include the various phosphate esters that have boiling points above 750° F. and are widely used as hydraulic fluids, and liquid metals. It is also possible to use molten pattern material of the same composition as the patterns and to remove accumulations of the molten material whenever necessary. Still other liquids which can be used in particular situations include trichloroethylene, tetrachloroethylene, tetrabromoethylene, bis-(m-phenoxyphenyl) ether, and, in instances in which the molds will not be adversely effected by moisture, water, a salt solution, and the like.

As generally described above, the pressure under which the hot liquid is maintained during the pattern removal operation counteracts the expansion forces produced by the patterns as they melt and thereby substantially reduces the occurrence of mold cracking. The pressure required in any given situation in order to counteract the expansion forces of the pattern material depends upon such factors as the thermal expansion coefficient of the pattern material, the melting characteristics of the pattern matedensity of the liquid. For example, substantially lower pressures are required when removing patterns from the thick, relatively strong bulk molds than from the weaker, thin-walled ceramic shell molds. Lower pressures also may be required for melting wax patterns than when melting patterns formed of a synthetic resin, such as polystyrene.

In carrying out the process described in conjunction with FIG. 1, it is possible to pressurize the tank containing the mold prior to the introduction of the hot liquid in order to obtain the advantage of significant pressure at the start of the pattern removal operation. In such instances, the pressure in the tank containing the mold must be sufficiently lower than the pressure in the tank containing the liquid so that the liquid will be forced into the mold tank at the desired rate.

Figures 2, 3:
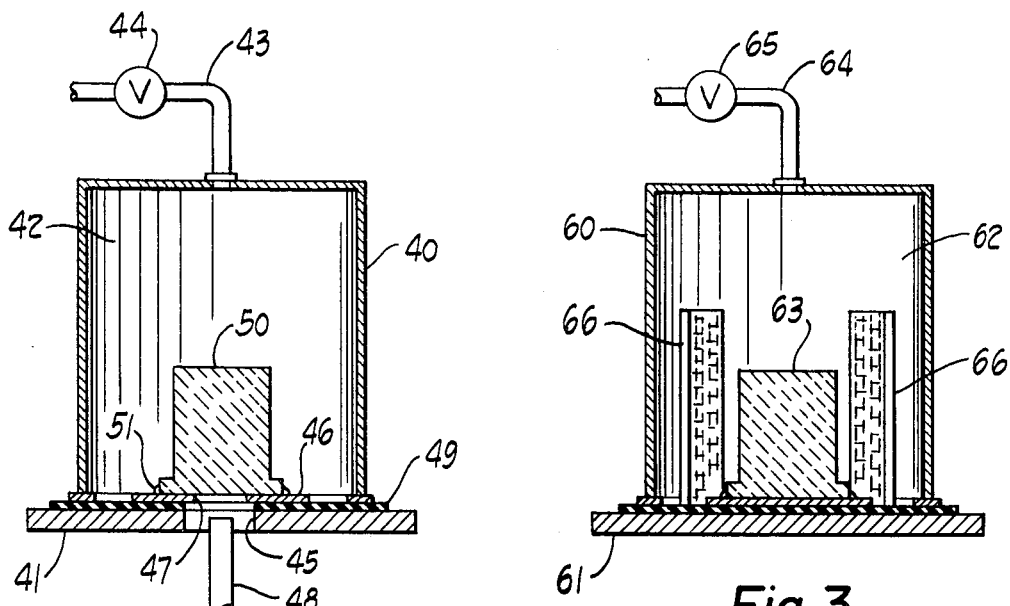
FIG. 2 is an elevational view, partially in cross-section, diagrammatically illustrating an apparatus useful in carrying out another preferred embodiment of the process of this invention.
FIG. 3 is a view diagrammatically illustrating an apparatus for carrying out still another preferred embodiment of the process of this invention.

Reference is now made to FIG. 2 which illustrates an apparatus for carrying out a pattern removal operation in which air or another gas is used as the heating and pressure-transmitting medium. The apparatus illustrated in FIG. 2 is shown to comprise a steel casing or housing 40 which is removably mounted on a bottom plate 41 to define a pressure chamber 42. A conduit 43 is connected to the casing 40 and to a suitable source of gas under pressure, such as a compressed air supply. The supply of gas under pressure to the chamber 42 is adapted to be controlled by a valve 44 in the conduit 43.

The bottom plate 41 is provided with a central opening 45 and a brass plate 46 or the like having a central opening 47 disposed on the bottom plate above the opening 45. A pipe 48 extends into the aligned openings 45, 47 and is adapted to be connected to a source of hot gas, such as a hot air drier (not shown). The casing 40 may be connected to the bottom plate 41 by bolts (also not shown) and an intermediate sealing gasket 49.

In carrying out a pattern removal operation using the apparatus shown in FIG. 2, a refractory mold 50, containing the patterns to be melted out, is placed on the plate 46 with the sprue opening of the mold above the aligned holes 45, 47. Wet asbestos 51 may be used to form a seal between the mold and the plate 46.

When the casing 40 has been bolted or otherwise secured to the bottom plate 41, compressed air or other gas is admitted to the chamber 42 at the desired pressure. Hot air supplied from the hot air drier or other source is admitted into the pipe 48 which delivers the air through the bottom plate into contact with the patterns in the mold 50. The mold 50 may be allowed to remain in the chamber 42 under the conditions of heat and pressure until the pattern material has melted and drained from the mold opening.

Various hot gases and pressurizing atmospheres can be substituted for the specifically disclosed hot air and compressed air supplies. The heating gases and pressurizing atmosphere to which the mold is subjected should be inert to the mold materials in the sense that it will not soften the molds and/or react with the refractory binder solution to evolve steam or other volatile matter. When the binder of the mold is water soluble and when the refractory material and be softened or otherwise adversely effected by moisture, the relative humidity of the atmosphere should be less than 100% so that there will be no condensation of moisture on the mold. As distinguished from the prior art practice involving the use of an autoclave and saturated steam under pressure, subjecting the mold to a pressurized atmosphere having less than 100% relative humidity avoids the occurrence of cracking and flaking of the mold material due to boiling of condensed water in the pores of the mold when the pressure is released. As further distinguished from the use of an autoclave, the chamber 42 is preferably pressurized prior to the introduction of the hot air or other gas in order to obtain the full benefit of the pressure at the outset of the pattern removal operation.

The particular pressure required to prevent cracking of the mold will vary depending upon the factors mentioned above in connection with the process carried out by use of the apparatus of FIG. 1. Pressures as low as 5 pounds per square inch gauge have been used successfully to remove wax patterns from shell molds. Polystyrene patterns have been successfully removed from shell molds using slightly higher pressures of 7 to 8 pounds per square inch gauge.

FIG. 3 illustrates another apparatus for carrying out the embodiment of this invention wherein the refractory molds are heated in a pressurized atmosphere. As shown in FIG. 3, the apparatus comprises a housing 60 mounted on a plate 61 to form a closed chamber 62. The chamber 62 is of a size sufficient to hold one or more molds 63 containing the patterns to be melted out. Each of the molds may be disposed over a suitable member, such as a tank (not shown) in the chamber 62 for receiving the melted pattern material. The chamber 62 is adapted to be pressurized by compressed air or the like which is delivered through a conduit 64 and a control valve 65.

Infra-red heaters 66 or the like are provided within the chamber 62 for heating the molds. The preferred infra-red heaters involve no flames and serve to melt out the patterns by radiation. The heaters may be of the type which operate in a temperature range of from about 1000° F. to about 3100° F. and are therefore satisfactory for melting plastic patterns, as well as patterns formed of wax and other materials.

In use the pressure in the chamber 62 is preferably adjusted to equalize the pressure on the inside and outside of the mold as the pattern material is melted out. When the patterns are in intimate contact with the mold so that they are capable of exerting pressure against the mold when heated, maximum air pressure is used to resist the expansion forces of the heated patterns. As the patterns are progressively melted to provide a space of increasing size in each mold cavity, the pressure in the chamber 62 may be gradually relieved. This technique permits the use of much higher pressures which may be desirable depending upon the size, shape and composition of the patterns, the particular heating method employed, and the type of mold involved. As discussed above in connection with the use of the apparatus shown in FIG. 2, the pressurized atmosphere in the chamber 62 should have a relative humidity of less than 100%.

EXAMPLE I

Ten patterns of a complicated commercial part, each pattern weighing 12.9 grams, were formed of a blend of waxes, a polymerized rosin and a synthetic resin. The pattern material formulation was as follows:

| Material: | Percent by weight |
|---|---|
| Modified pale wood rosin | 43 |
| High molecular weight ethylene/vinyl acetate copolymer | 15 |
| Paraffin wax | 19 |
| Microcrystalline wax | 9 |
| Fischer-Tropsch wax | 14 |

The 10 patterns were attached to a wax center tree having a height of 6 inches and a diameter of 1¾ inches in order to form a pattern set-up or tree. The wax center tree was mounted on a wax base having a height of 2 inches and a diameter of 3 inches. This pattern assembly or set-up was used to produce a ceramic shell mold. The mold was made in accordance with normal, shell-making practice by dipping the set-up in a refractory slurry formed of three parts zircon powder and two parts fused silica powder suspended in a bonding liquid consisting essentially of a colloidal silica sol, a small amount of an organic film former, and minor amounts of a wetting and defoaming agent. The first two dips were sanded with granular zircon and the next four coatings were sanded with a coarse fire clay grog. The seventh and final dip coating was left unsanded. Each dip coating was allowed to dry thoroughly before application of the next dip coating, and following application of the seventh coating, the mold was allowed to dry overnight. The final wall thickness of the ceramic shell mold was approximately 3/16 of an inch.

The dried shell mold containing the patterns to be removed was processed in the apparatus shown in FIG. 1. In carrying out the process, the mold was placed in the tank 11 and hot glycerine at a temperature of 240° F. was forced from the tank 10 into the tank 11 under a pressure of 120 pounds per square inch gauge. The pressure in the system was maintained for 15 minutes and fluctuated with the line pressure from 90 to 120 p.s.i. gauge. During this time, the temperature of the glycerine dropped to 200° F.

As the end of 15 minutes, the patterns and the wax center tree were found to be completely soft, although the melted pattern had not yet floated out of the mold. There was no evidence of any cracking of the mold walls. The mold containing the softened pattern material was transferred to a container of hot glycerine at 350° F. to complete the pattern removal under normal atmospheric pressure. The mold with the patterns removed was found to be perfect in all respects. An identical ceramic shell mold made at the same time using an identical pattern set-up or tree was dewaxed in a similar manner but without the application of pressure. The mold cracked badly during the initial heating in the hot glycerine.

EXAMPLE II

In this example of the invention, wax patterns were removed from a shell mold of the type described in U.S. Pat. No. 3,249,972. The cylindrical body of the mold had an inner diameter of 5 5/8 inches and a length of 12 inches. The mold body was formed around a set-up having 67 wax patterns in a manner similar to that described in Example I above except that six coatings were formed on the set-up and all coatings were stuccoed with fire clay grog.

The mold was dewaxed in the apparatus shown in FIG. 1 using hot glycerine at 420° F. and under a pressure of 110 to 120 p.s.i. gauge. After 10 minutes the patterns were completely removed from the mold without any trace of wax remaining. The dewaxed mold was completely free of cracks.

The mold was then fired to 2000° F. and a resin bonded sand core was positioned within the passageway of the mold body to define a 1/4 inch sprue cavity. During casting of the mold, a vacuum was drawn around the mold and 27 pounds of 6150 low alloy steel at 2950° F. was poured into the sprue cavity. The castings obtained were satisfactory in all respects.

EXAMPLE III

Two identical wax set-ups or trees were made, each comprising five patterns of a commercial part 7 inches long 3/8 inch thick by 1/2 to 1 1/4 inches wide. The patterns were attached to a 7 inch high by 1 3/4 inch diameter center tree which in turn was mounted on a base having a height of 2 inches and a diameter of 4 inches. A six coat ceramic shell mold was formed around each pattern set-up in the manner described in conjunction with Example I, except that the last four coatings of each mold were formulated using a sodium silicate solution as the binder and carrier liquid for the dip coat slurry.

One of the completed shell molds was dewaxed in the apparatus shown in FIG. 1 using glycerine at a temperature of about 330° F. under 90 to 95 pounds per square inch gauge for 10 minutes. The pattern set-up was completely removed from the mold without any cracking.

The other shell mold was dewaxed in an autoclave using saturated steam under the same conditions of temperature and pressure and for the same length of time. This mold was found to be cracked in the portions defining the five pattern cavities. The results obtained clearly indicate the advantage of using a heating and pressurizing medium which is inert to the shell material and which will not dissolve the binder.

EXAMPLE IV

A pattern set-up was prepared consisting of four wax patterns mounted on a wax center tree. Each pattern was 3/8 of an inch by 3/4 of an inch and 1 5/8 inches long. The center tree was 1 3/4 inches in diameter and 4 inches high. The pattern assembly or set-up was used to produce a six-dip ceramic shell mold according to the procedure described in Example I.

The mold was processed in the apparatus diagrammatically illustrated in FIG. 2 to remove the patterns. In removing the patterns from the mold, compressed air was first admitted to the chamber 42 at a gauge pressure of 5 pounds. Hot air supplied from a hot air drier was then admitted into the pipe 48 which delivered the air through the bottom plate into contact with the pattern assembly in he mold. The hot air drier which was used was capable of delivering 35 cubic feet of air per minute at a velocity of 3000 feet per minute and at a temperature of from 500° F. to 750° F. The hot air mixed with the room temperature air in the pipe 48 before contacting the pattern assembly so that the effective operating temperature of the air was somewhat lower than the temperature of the air supplied from the drier. Nevertheless, the six-dip shell mold was successfully dewaxed at the resulting low temperature despite a slow heating rate of approximately 2 hours. Castings made in the shell mold after preheating it to 2000° F. were excellent and confirmed that the dewaxing operation had been satisfactory. Similar shells processed under the same conditions and with the same equipment, but with the compressed air source disconnected, cracked in many places and were not satisfactory for casting.

EXAMPLE V

The apparatus shown in FIG. 2 was used to burn out a pattern set-up or tree consisting of three polystyrene patterns mounted on a wax base. Each polystyrene pattern was a replica of a typical commercial part and weighed 4 2/3 grams. The wax base was 2 3/4 inches in diameter and 1 3/4 inches high. This assembly was used to prepare another six dip ceramic shell mold in a manner similar to that described in Example I.

Compressed air at 7 to 8 pounds gauge pressure was admitted into the chamber 42 and the chamber was heated using hot air supplied by the drier described in Example IV. After the wax center tree had been melted out of the mold, the pipe 48 was disconnected and an oxyacetylene torch was substituted to provide the intense heat necessary to burn out the polystyrene patterns. When the patterns were completely burned out by the direct flame of the torch, the mold was inspected and found to be free of cracks and satisfactory for casting. As previously described, past experience has shown that plastic patterns which are 1/4 to 1/2 the size of patterns successfully processed in this example of the invention could not be removed from shell molds by a flash burn-out at a temperature of 2000° F. without cracking the shell.

In Examples IV and V described above, a very slow heating procedure was deliberately chosen in order to demonstrate the effectiveness of the air pressure used in the pattern removal process. It is recognized that slow heating to remove patterns from shell molds is usually the most undesirable technique, and most practices heretofore followed have been based on rapid heating. Nevertheless, as shown above, the thin walled shell molds can be successfully processed by slow heating in conjunction with a pressurizing step. Best results are obtained when the pressure is applied to the mold prior to heating and this practice is preferred.

It will be seen that each illustrated example of this invention comprises a novel procedure of heating the molds to melt or soften the patterns while subjecting the molds to a pressurized medium that is preferably inert to the mold material. The pressure of the medium to which the mold is subjected is adjusted to counteract the cracking forces produced by the pattern material as it is melted from the molds. In Examples I, II and III described above, the heating and pressure transmitting medium is a liquid which will not soften the refractory material of the mold or dissolve the binder. In the embodiment of the invention described in conjunction with Examples IV and V, the heating and pressurizing medium is a gas, such as air.

In carrying out each embodiment of the invention, the pressure and temperature of the medium to which the molds are subjected can be independently controlled, and the molds can be pressurized at the outset of the pattern removal operation. By initially applying full or partial pressure to the chambers in which the molds are contained, it is possible to obtain the full benefit of the pressure to prevent cracking before any heating of the patterns occurs. It will also be seen that the processes of this invention in all of the described embodiments is suitable for use with substantially all types of pattern materials and molds and, at the same time, overcomes the various problems associated with conventional pattern removal operations.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. In an investment molding process wherein a refractory mold is formed around a pattern which can be destroyed when subjected to heat, a method of removing the pattern from the mold comprising the steps of placing the mold in a chamber, introducing into the chamber in direct surrounding contact with the mold a liquid which will not dissolve the binder or soften the refractory material of the mold, heating the liquid to a temperature sufficient to soften the pattern, and placing the liquid under pressure above atmospheric to resist the cracking forces on the mold produced by the pattern as it is heated.

2. A method as claimed in claim 1 wherein the liquid is heated and placed under pressure before being introduced into the chamber.

is pressurized before the pattern is heated by the liquid.

4. In an investment casting process wherein a refractory mold is formed around the pattern which can be destroyed when subjected to heat, a method of removing the 3. A method as claimed in claim 1 wherein the chamber pattern from the mold comprising the steps of pressurizing the outside of the mold and then subjecting the mold to a directly surrounding, hot liquid under pressure above atmospheric in order to heat and soften the pattern and to resist the cracking forces on the mold produced by the pattern as it is heated.

5. In a process of investment casting wherein a refractory mold is formed around a pattern which can be destroyed when subjected to heat, a method of removing the pattern from the mold comprising the steps of heating the mold to soften the pattern in a pressurized gas having a relative humidity less than 100%, said gas being under a pressure above atmospheric so as to resist the cracking forces on the mold produced by the pattern as it is heated.

6. A method as claimed in claim 5 wherein the mold is heated by a hot gas.

7. A method as claimed in claim 5 wherein the mold is heated by radiant heating means.

8. In an investment casting process wherein a refractory mold is formed around a pattern which can be destroyed when subjected to heat, a method of removing the pattern from the mold comprising the steps of enclosing the mold in a chamber, heating the mold sufficiently to soften the pattern, and subjecting the mold to a directly surrounding gas having a relative humidity of less than 100%, said gas being under a pressure above atmospheric so as to resist the cracking forces on the mold produced by the pattern as it is heated.

9. A method as claimed in claim 8 wherein the chamber is pressurized prior to heating the mold.

10. A method as claimed in claim 8 including the step of gradually reducing the pressure of the gas in the chamber as the pattern is progressively softened and melted in the mold.

11. A method as claimed in claim 8 wherein the mold is heated by a stream of hot gas.

12. A method as claimed in claim 8 wherein the mold is heated by radiant heating means.

References Cited
UNITED STATES PATENTS

| | | | |
|---|---|---|---|
| 2,441,695 | 5/1948 | Feagin et al. | 264—221 |
| 2,842,820 | 7/1958 | Brennan | 264—221 |
| 3,222,738 | 12/1965 | Carter | 264—221 |
| 3,339,622 | 9/1967 | Horton | 264—221 |
| 3,364,039 | 1/1968 | Tambussi | 264—221 |
| 3,420,644 | 1/1969 | Lirones | 264—221 |

DONALD J. ARNOLD, Primary Examiner

H. MINTZ, Assistant Examiner

U.S. Cl. X.R.

164—34, 36

UNITED STATES PATENT OFFICE
CERTIFICATE OF CORRECTION

Patent No. 3,636,190           Dated January 18, 1972

Inventor(s) Robert A. Horton

It is certified that error appears in the above-identified patent and that said Letters Patent are hereby corrected as shown below:

Column 2, line 27, "melten" should be -- melted --.
Column 7, line 59, "and" should be -- can --.
Column 10 line 19, "he" should be -- the --.
Column 11, cancel lines 47 through 53 in their entirety and insert the following:

-- 3. A method as claimed in claim 1 wherein the chamber is pressurized before the pattern is heated by the liquid.

4. In an investment casting process wherein a refractory mold is formed around the pattern which can be destroyed when subjected to heat, a method of removing the pattern from the mold comprising the steps of pressurizing the outside of the mold and then subjecting the mold to --.

Signed and sealed this 20th day of June 1972.

(SEAL)
Attest:

EDWARD M.FLETCHER, JR.                ROBERT GOTTSCHALK
Attesting Officer                     Commissioner of Patents